United States Patent Office 2,959,579
Patented Nov. 8, 1960

2,959,579
POLYMERIZATION OF ETHYLENE AND CATALYST THEREFOR

Hugh Wilma Boulton Reed and Peter Smith, both of Norton Hall, The Green, Norton-on-Tees, England No Drawing. Original application Dec. 19, 1955, Ser. No. 553,713. Divided and this application May 27, 1958, Ser. No. 738,041

Claims priority, application Great Britain Apr. 15, 1955

2 Claims. (Cl. 260—94.9)

This invention relates to the polymerization of olefins.

The application is a division of our co-pending application Serial No. 553,713, filed December 19, 1955.

A process for the polymerization of olefins is known in which the olefin is brought into contact with a material formed by reacting an organo-compound of a non-transition metal with a halide of a transition metal of groups 4 to 6 inclusive of the periodic system.

This process is applicable to the polymerization of a variety of olefins including ethylene and propylene.

Particularly suitable organo-compounds for use in this process are for example alkyls of alkali metals such as sodium and lithium and alkyls of zinc, magnesium or aluminum. Particularly suitable halides of a transition metal of groups 4 to 6 are titanium tetrachloride and vanadium tetrachloride.

The process is preferably carried out in the presence of an inert solvent such as a paraffinic, alicyclic or aromatic hydrocarbon.

The olefin may be brought into contact with the aforesaid material as a gas or as a liquid and sufficient pressure may be applied to maintain the olefin in the liquid phase.

The temperature at which the polymerization process is carried out is preferably below 100° C.

We have now found that the efficiency of this known process can be improved by bringing the olefin into contact with the aforesaid material in the presence of an organo-metal halide or a metal halide of groups 2, 3 and 8 of the periodic system which is a catalyst for Friedel-Crafts reactions.

According to the present invention therefore there is provided a process for the polymerization of olefins in which the olefin is brought into contact with an organo-metal halide or a halide of a metal of groups 2, 3 or 8 of the periodic system which is a catalyst for Friedel-Crafts reactions and a material formed by reacting an organo-compound of a non-transition metal with a halide of a transition metal of groups 4 to 6 of the periodic system.

A non-transition metal is defined as a metal of one of the short periods of the periodic system or a metal of one of the long periods occupying one of the two places immediately following an inert gas or one of the seven places which immediately precede an inert gas.

Very suitable organo-metal halides for use in the process of the invention are alkyl aluminum halides particularly ethyl aluminum sesquichloride. An example of a suitable halide of a group 2, 3 or 8 metal is aluminum chloride.

When ethyl aluminum sesquichloride is used it is preferred that it is present in an amount which amounts to at least 5% by weight of organo compound.

The use of an organo-metal halide or halide of a group 2, 3 or 8 metal is of value in increasing the activity of the material used to effect the polymerization of the olefin. This effect is particularly valuable when it is desired to form the material by reacting together the organo-compound and the transition metal halide in a molecular ratio greater than 4:1, for instance when it is desired to economise in the use of transition metal halide. As the molecular ratio organo-compound:transition metal halide is increased the material formed tends to become progressively less active particularly when the organo-compound is an aluminum alkyl. Thus the material formed by reacting aluminum triethyl and titanium tetrachloride in a molecular ratio of 8:1 has only a very low activity.

While the process of the invention is particularly applicable to the polymerization of ethylene to solid polymers it is also applicable to the polymerization of other olefins such as propylene.

It is preferred that the organo-compound is an aluminum alkyl and that the transition metal halide is a titanium tetrahalide for example titanium tetrachloride.

EXAMPLE 1

The apparatus used in the following experiments consisted of a 10 liter flask fitted with a gas inlet tube, a dropping funnel, a condenser and a stirrer. Water was excluded from the apparatus and the air displaced by an atmosphere of nitrogen.

The aluminum triethyl used contained ethyl aluminum sesquihalide.

In experiment 1, 0.049 mole titanium tetrachloride dissolved in 100 mls. hexane was introduced into the 10 liter flask and stirred while 0.049 mole aluminum triethyl dissolved in 50 mls. hexane was added. A brown solution and precipitate were formed. The mixture of solution and precipitate was then stirred and ethylene passed into the flask at 40 liters/hour so that it contacted the surface of the said mixture. The pressure in the flask was atmospheric pressure. A vigorous exothermic reaction occurred. Since the reaction mixture became more difficult to stir as the amount of polymer formed increased normal hexane was continuously added to the reaction mixture. The total amount of normal hexane added was approximately 3 liters.

After a period given in the table below the flow of ethylene was discontinued and ethanol added to the reaction mixture until the solution became blue and the deposit of polymer became white. This deposit was then filtered off, washed and dried.

The results of experiment 1 are recorded in the following table together with the results of four further experiments carried out under the same conditions as used in experiment 1 except that different amounts of titanium tetrachloride and aluminum tri-ethyl as indicated in the table were employed.

Table

| Expt. No. | Hours $C_2H_4$ passed | Moles $Al(C_2H_5)_3$ | Moles $TiCl_4$ | Moles $Al(C_2H_5)_3$ / Moles $TiCl_4$ | Wt. of polymer produced (grams) | Moles $C_2H_4$ polymerized per mole $TiCl_4$ | Moles $C_2H_4$ polymerized per mole $Al(C_2H_5)_3$ |
|---|---|---|---|---|---|---|---|
| 1 | 3.0 | 0.049 | 0.049 | 1.0 | 162 | 118 | 118 |
| 2 | 14.0 | 0.052 | 0.038 | 1.3 | 640 | 601 | 440 |
| 3 | 2.5 | 0.037 | 0.012 | 3.0 | 107 | 318 | 103 |
| 4 | 6.0 | 0.058 | 0.011 | 5.8 | 267 | 867 | 164 |
| 5 | 9.5 | 0.061 | 0.008 | 7.8 | 250 | 1130 | 145 |

The melt viscosities at 197° C. of the polymers produced in experiments 1 to 5 were $4\times10^5$, $1.9\times10^7$, $2.3\times10^8$, $5.4\times10^8$, $3.8\times10^8$ poises respectively.

EXAMPLE 2

The following experiments were carried out in a 1 liter stainless steel autoclave under pressure.

In experiment 1, 0.041 mole titanium tetrachloride dissolved in 100 ml. cyclohexane was mixed with 0.016 mole aluminum triethyl dissolved in 50 ml. cyclohexane and the mixture at a temperature of 20° C. introduced into the dry autoclave from which the air had been displaced by nitrogen. The aluminum triethyl contained ethyl aluminum sesquihalide.

Ethylene was then introduced into the autoclave, until the pressure attained 6 atmospheres. A vigorous exothermic reaction took place.

After 20 minutes the reaction mixture was removed from the autoclave and treated to obtain the polymer as described in Example 1.

The results of experiment 1 are recorded in the following table together with the results of experiments 2 and 3 which were carried out under the same conditions as used in experiment 1 except that different amounts of titanium tetrachloride and aluminum triethyl as indicated in the table were employed. Experiment 4 was carried out in the same way except that the pressure was 40 atmospheres' gauge.

Table

| Expt. No. | Moles Al(C$_2$H$_5$)$_3$ | Moles TiCl$_4$ | Moles Al(C$_2$H$_5$)$_3$ / Moles TiCl$_4$ | Wt. of polymer produced (grams) | Moles C$_2$H$_4$ polymerized per mole TiCl$_4$ | Moles C$_2$H$_4$ polymerized per mole Al(C$_2$H$_5$)$_3$ |
|---|---|---|---|---|---|---|
| 1 | 0.016 | 0.041 | 0.38 | 43 | 38 | 98 |
| 2 | 0.035 | 0.035 | 1.0 | 55 | 56 | 56 |
| 3 | 0.044 | 0.016 | 2.7 | 67 | 150 | 56 |
| 4 | 0.035 | 0.034 | 1.03 | 139 | 146 | 142 |

The melt viscosities at 197° C. of the polymer obtained in experiments 1 to 4 were respectively $1.9\times10^4$, $4.5\times10^6$, $2.3\times10^8$, and $3\times10^5$ poises.

EXAMPLE 3

The following experiments demonstrate the effect of ethyl aluminum sesquichloride on the activity of a reaction medium comprising a material formed by reacting aluminum triethyl and titanium tetrachloride. Throughout the experiments moisture and oxygen were excluded from the apparatus and reactants.

The apparatus consisted of a 1-liter flask fitted with a gas inlet tube, a dropping funnel, a condenser and a stirrer.

The reaction medium was prepared by introducing the titanium tetrachloride dissolved in 50 ml. petroleum ether (60° to 80° C.) into the flask and adding the aluminum triethyl dissolved in 50 ml. petroleum ether (60° to 80° C.) while vigorously stirring the mixture.

The reaction medium which consisted of a brown solution and precipitate, was then stirred and ethylene passed for 1 hour into the flask so that it contacted the surface of the reaction medium. In experiments 1 to 4 the ethylene rate was 40 liters/hour while in experiment 5 it was 50 liters/hour.

In the following table of results the weights of titanium tetrachloride and aluminum triethyl used in preparing the reaction medium are given together with the uptake of ethylene and the conversion of ethylene to polyethylene. In experiments 1 and 2, the aluminum triethyl contained substantially no halide, while in experiments 3, 4 and 5, the aluminum triethyl contained 0.2 gram, 1.1 gram and 1.0 gram respectively of ethyl aluminum sesquihalide.

Table

| Expt. No. | Weight in grams of | | Molar ratio Aluminum triethyl: Titanium tetrachloride | Uptake of ethylene (liters) | Conversion of ethylene, percent |
|---|---|---|---|---|---|
| | Aluminum triethyl | Titanium tetrachloride | | | |
| 1 | 5.0 | 2.0 | 4.2 | 28.9 | 72 |
| 2 | 5.0 | 1.02 | 8.3 | 4 | 10 |
| 3 | 5.06 | 1.02 | 8.5 | 2.6 | 6.5 |
| 4 | 5.0 | 1.02 | 8.3 | 24.1 | 60 |
| 5 | 5.06 | 1.02 | 8.5 | 43.2 | 87 |

We claim:
1. A catalyst suitable for the polymerization of ethylene consisting essentially of the product obtained by mixing titanium tetrachloride with an aluminum tri-lower alkyl in a molar ratio of said aluminum tri-lower alkyl to tetrachloride of from 8.3–8.5 to 1, and about 20% by weight, based on the weight of said aluminum tri-lower alkyl, of ethyl aluminum sesquichloride.

2. A process for the polymerization of ethylene which comprises bringing said ethylene into contact with the catalyst of claim 1.

References Cited in the file of this patent

UNITED STATES PATENTS

| 2,838,477 | Roelen et al. | June 10, 1958 |
| 2,905,645 | Anderson et al. | Sept. 22, 1959 |

FOREIGN PATENTS

| 534,792 | Belgium | Jan. 31, 1955 |

UNITED STATES PATENT OFFICE
CERTIFICATION OF CORRECTION

Patent No. 2,959,579                              November 8, 1960

Hugh Wilma Boulton Reed et al.

It is hereby certified that error appears in the above numbered patent requiring correction and that the said Letters Patent should read as corrected below.

In the grant, lines 1, 2, and 3, for "Hugh Wilma Boulton Reed and Peter Smith, of Norton-on-Tees, England," read -- Hugh Wilma Boulton Reed and Peter Smith, of Norton-on-Tees, England, assignors to Imperial Chemical Industries Limited, of Millbank, London, England, a corporation of Great Britain, --; line 12, for "Hugh Wilma Boulton Reed and Peter Smith, their heirs" read -- Imperial Chemical Industries Limited, its successors --; in the heading to the printed specification, lines 4 and 5, for "Hugh Wilma Boulton Reed and Peter Smith, both of Norton Hall, The Green, Norton-on-Tees, England" read -- Hugh Wilma Boulton Reed and Peter Smith, Norton-on-Tees, England, assignors to Imperial Chemical Industries Limited, Millbank, London, England, a corporation of Great Britain --.

Signed and sealed this 20th day of June 1961.

(SEAL)
Attest:

ERNEST W. SWIDER                              DAVID L. LADD
Attesting Officer                             Commissioner of Patents